(12) United States Patent
Harter

(10) Patent No.: US 12,054,032 B2
(45) Date of Patent: Aug. 6, 2024

(54) MOTOR VEHICLE

(71) Applicant: Dr. Ing. h.c. F. Porsche Aktiengesellschaft, Stuttgart (DE)

(72) Inventor: Sebastian Harter, Weissach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 193 days.

(21) Appl. No.: 17/338,711

(22) Filed: Jun. 4, 2021

(65) Prior Publication Data

US 2021/0379965 A1 Dec. 9, 2021

(30) Foreign Application Priority Data

Jun. 9, 2020 (DE) .................. 10 2020 115 246.9

(51) Int. Cl.
*B60H 1/26* (2006.01)
*B60H 1/00* (2006.01)
*B60R 19/52* (2006.01)

(52) U.S. Cl.
CPC ........... *B60H 1/26* (2013.01); *B60H 1/00678* (2013.01); *B60H 1/00764* (2013.01); *B60H 1/00842* (2013.01); *B60R 19/52* (2013.01); *B60R 2019/527* (2013.01)

(58) Field of Classification Search
CPC .. B60H 1/26; B60H 1/00678; B60H 1/00764; B60H 1/00842; B60R 19/52; B60R 2019/527
USPC ........................................................ 454/143
See application file for complete search history.

(56) References Cited

U.S. PATENT DOCUMENTS

| | | | | |
|---|---|---|---|---|
| 3,927,554 A * | 12/1975 | Langhorst | ......... | G01M 17/0078 73/11.04 |
| 6,990,845 B2 * | 1/2006 | Voon | ......... | G01N 3/48 73/12.14 |
| 9,333,850 B2 * | 5/2016 | Ruppert | ......... | B60K 11/085 |
| 9,377,386 B2 * | 6/2016 | Ruth | ......... | G01N 3/30 |
| 9,828,036 B2 * | 11/2017 | Frayer | ......... | H01Q 1/3233 |
| 10,464,412 B2 * | 11/2019 | Dudar | ......... | B60K 11/085 |
| 10,787,141 B2 * | 9/2020 | Vacca | ......... | B60R 19/52 |
| 10,941,694 B2 | 3/2021 | Ritz | | |
| 2003/0067178 A1 * | 4/2003 | Bastien | ......... | B60R 19/12 293/120 |
| 2005/0207167 A1 | 9/2005 | Larson et al. | | |

(Continued)

FOREIGN PATENT DOCUMENTS

CN 209921048 U 1/2020
DE 102004013775 A1 10/2005

(Continued)

OTHER PUBLICATIONS

WIPO translation of KR-20030027982-A (Year: 2001).*

*Primary Examiner* — Ko-Wei Lin
(74) *Attorney, Agent, or Firm* — LEYDIG, VOIT & MAYER, LTD.

(57) ABSTRACT

A motor vehicle includes a motor vehicle front end with at least one cooling-air opening. The cooling-air opening is formed with an encircling edge which, at least at the two lateral side regions, has a projecting edge region. In the cooling-air opening, there is arranged at least one cooling-air slat which extends through the cooling-air opening and divides the cooling-air opening into at least two separate partial openings.

15 Claims, 3 Drawing Sheets

(56) References Cited

U.S. PATENT DOCUMENTS

| | | | |
|---|---|---|---|
| 2013/0092462 A1* | 4/2013 | Chinta | B60K 11/085 |
| | | | 180/68.1 |
| 2016/0016617 A1* | 1/2016 | Wolf | B60K 11/04 |
| | | | 296/208 |
| 2016/0096425 A1* | 4/2016 | Walters | B60K 11/085 |
| | | | 180/68.1 |
| 2017/0050510 A1* | 2/2017 | Manhire | B60K 11/085 |
| 2017/0334284 A1* | 11/2017 | Drozdowski | B60R 19/52 |
| 2019/0270376 A1* | 9/2019 | Sedlak | B60K 11/085 |
| 2019/0389411 A1* | 12/2019 | Hodoya | B60R 19/48 |
| 2020/0055388 A1* | 2/2020 | Gerber | B60R 19/52 |
| 2021/0379965 A1* | 12/2021 | Harter | B60K 11/085 |

FOREIGN PATENT DOCUMENTS

| | | | | |
|---|---|---|---|---|
| DE | 102012100537 A1 * | 7/2013 | | B60K 11/085 |
| DE | 102012100537 A1 | 7/2013 | | |
| DE | 102013113489 A1 | 6/2015 | | |
| KR | 100435773 B1 * | 9/2001 | | B60R 19/52 |
| KR | 20030027982 A * | 4/2003 | | B60R 19/52 |
| WO | WO-2014064083 A1 * | 5/2014 | | B60H 1/26 |

\* cited by examiner

MOTOR VEHICLE

CROSS REFERENCE TO RELATED APPLICATIONS

This application claims benefit to German Patent Application No. DE 10 2020 115 246.9, filed on Jun. 9, 2020, which is hereby incorporated by reference herein.

FIELD

The disclosure relates to a motor vehicle having a motor vehicle front end with at least one cooling-air opening.

BACKGROUND

Motor vehicles having a motor vehicle front end with cooling-air openings are known. DE 10 2004 013 775 A1 has disclosed a motor vehicle having a motor vehicle front end with laterally arranged cooling-air openings, in the case of which in each case one lighting unit extends partially into the interior of the respective cooling-air opening. Here, the lighting unit occupies a significant proportion of the area of the cooling-air opening.

In modern motor vehicles, the demands with regard to exhaust-gas emissions are ever increasing, for which reason an ever-increasing amount of heat of the internal combustion engine must be dissipated, such that the cooling modules that have to be used must be made larger, and the air flows required for this must likewise increase. For this purpose, it is necessary for the cooling-air openings to have to be made larger in order to allow the required air flow to the cooling modules.

At the same time, the motor vehicles must be designed so as to satisfy the requirements of impact tests, for which reason pendulum tests with a pendulum with a 30° inclination with respect to the vehicle transverse direction must be satisfied.

SUMMARY

In an embodiment, the present disclosure provides a motor vehicle including a motor vehicle front end with at least one cooling-air opening. The cooling-air opening is formed with an encircling edge which, at least at the two lateral side regions, has a projecting edge region. In the cooling-air opening, there is arranged at least one cooling-air slat which extends through the cooling-air opening and divides the cooling-air opening into at least two separate partial openings.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

DETAILED DESCRIPTION

Figure 1:
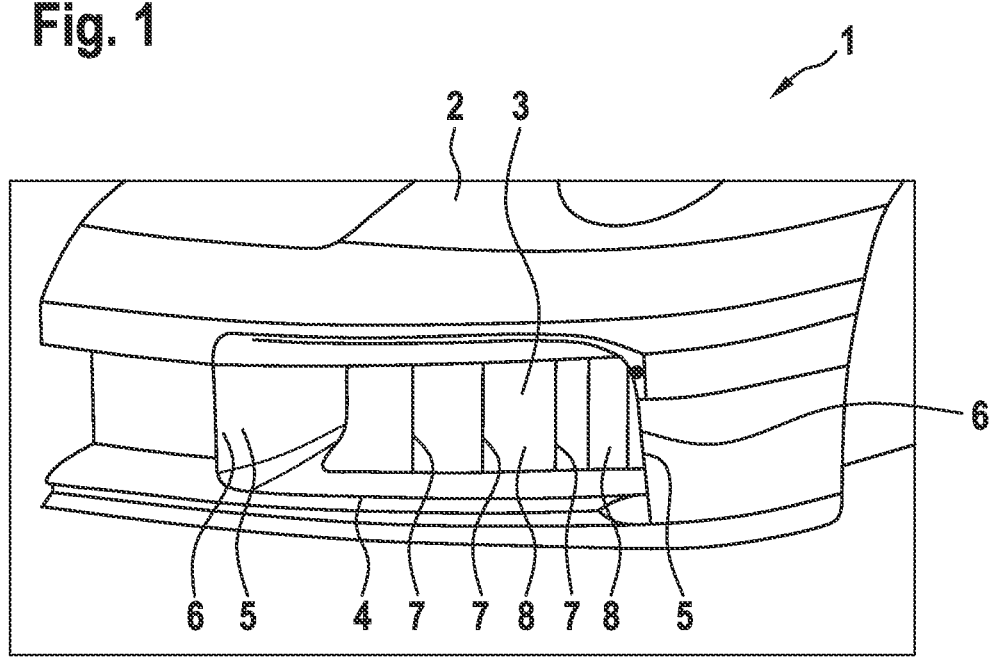
FIG. 1 shows a schematic view of a motor vehicle front end with a cooling-air opening.

The present disclosure provides a motor vehicle having a motor vehicle front end with at least one cooling-air opening, which motor vehicle front end satisfies the requirements with regard to impact tests and nevertheless allows a large air throughflow for improved cooling.

An exemplary embodiment relates to a motor vehicle having a motor vehicle front end with at least one cooling-air opening, wherein the cooling-air opening is formed with an encircling edge which, at least at the two lateral side regions, has a projecting edge region, wherein, within the cooling-air opening, there is arranged at least one cooling-air slat or there are arranged a multiplicity of cooling-air slats which extend(s) through the cooling-air opening and divide(s) said cooling-air opening into at least two separate partial openings. It is achieved in this way that the cooling-air opening can be designed to be sufficiently large and, nevertheless, the size does not lead to an ingress of a standardized body into the cooling-air opening in the case of the impact on the region of the cooling-air opening. At the same time, the required throughflow is allowed.

It is also expedient if the at least one cooling-air slat or in that the cooling-air slats extend(s) in a horizontal arrangement and/or in a vertical arrangement through the cooling-air opening. In this way, depending on the arrangement of the at least one cooling-air slat, the region of the cooling-air opening can be suitably divided such that an ingress of a standardized body can be prevented.

It is also expedient if the at least one cooling-air slat or in that the cooling-air slats are adjustable or in that at least one of the cooling-air slats is static and non-adjustable and in that at least one of the cooling-air slats is adjustable. In this way, the cooling-air slat or the cooling-air slats can be set as required such that the maximum throughflow, or a throughflow which satisfies the demand for cooling air and which is as expedient as possible in terms of flow, is allowed.

It is also expedient if the at least one adjustable cooling-air slat or in that the adjustable cooling-air slats is/are adjustable between a first position, in which the cooling-air slat allows the air flow through the cooling-air opening, and a second position, in which the cooling-air slat blocks the air flow through the cooling-air opening. In the first position, the maximum throughflow is attained, whereas, in the second operating position or in an intermediate position, a throughflow which satisfies the demand for cooling air and which is as expedient as possible in terms of flow can be attained.

It is also advantageous if the at least one static cooling-air slat is set in a first position in which the cooling-air slat allows the air flow through the cooling-air opening. In this way, in the case of the static cooling-air slat, the maximum air flow is attained.

It is also expedient, in a further exemplary embodiment, if the adjustable cooling-air slat or in that the adjustable cooling-air slats is/are set in the first position when the motor vehicle is at a standstill or at low vehicle speeds below a predefinable speed threshold value or up to a predefinable speed threshold value, and is/are adjustable into the second position only proceeding from vehicle speeds equal to or above the speed threshold value. It is thus achieved that, in a standstill situation and at low speeds, the 30° contact point of a 30° pendulum does not lie in the region of the cooling-air slats and, at higher vehicle speeds, the slats allow the control of the flow through the cooling-air opening.

It is also advantageous if the speed threshold value lies at 10 km/h, at 15 km/h or at some other predefinable value of the speed. In this way, suitable impact safety against a pendulum impact of the 30° pendulum is achieved in particular at low speeds.

It is also expedient if two cooling-air openings are arranged in a lateral position on the motor vehicle front end, and in that an impact-absorbing crossmember is arranged between the two cooling-air openings. In this way, a suitable design with two cooling modules in a lateral region of the motor vehicle front end is attained.

It is also particularly advantageous if the cooling-air slats are arranged in the cooling-air opening such that, in their first position, they are arranged such that a 30° contact point of a 30° pendulum in the event of a collision lies not on the cooling-air slats but on a projecting edge region of the cooling-air opening. In this way, the motor vehicle front end is protected against damage of paneling components, and the energy is introduced via the crossmember into the bodyshell structure.

It is also advantageous if the motor vehicle front end is designed such that the crossmember projects laterally into the region of the projecting edge region such that, in the event of a collision, a force can be transmitted via the projecting edge region to the crossmember. In this way, the motor vehicle front end is likewise protected in an improved manner against damage of paneling components, and the energy is introduced from the edge region of the cooling-air opening via the crossmember into the bodyshell structure.

FIG. 1 shows a motor vehicle 1 in a partial illustration, wherein only one side of the motor vehicle front end 2 can be seen. Typically, the motor vehicle 1 is of symmetrical form in this regard, such that the illustration of the other side of the vehicle can be omitted.

At least one cooling-air opening 3 is provided in the motor vehicle front end 2. It is typically the case that two cooling-air openings 3 are provided in each case laterally on the motor vehicle front end 2. They are arranged symmetrically with respect to the vehicle center.

The illustrated and/or the respective cooling-air opening 3 is formed with an encircling edge 4 which, at least at the two lateral side regions 5, has a projecting edge region 6.

Within the cooling-air opening 3, there is arranged at least one cooling-air slat 7 or there are arranged a multiplicity of cooling-air slats 7 which extend(s) through the cooling-air opening 3 and divide(s) said cooling-air opening into at least two separate partial openings 8.

Here, the cooling-air slat 7 or the cooling-air slats 7 may extend in a horizontal arrangement and/or in a vertical arrangement through the cooling-air opening 3. It is also possible for a type of grille to be generated in this way. In the exemplary embodiment shown in FIG. 1, the cooling-air slats 7 are oriented vertically. In the exemplary embodiment shown in FIG. 5, the cooling-air slats 7 are oriented horizontally.

In one particular exemplary embodiment, the at least one cooling-air slat 7 or the cooling-air slats 7 is/are adjustable. It may also be advantageous if at least one of the cooling-air slats 7 is static and non-adjustable and that at least one of the cooling-air slats 7 is adjustable. It is also possible for each of the cooling-air slats 7 to be static, or for each of the cooling-air slats 7 to be adjustable. It is also possible for one static cooling-air slat 7 to be provided, or static cooling-air slats 7 may be provided. It is also possible for one adjustable cooling-air slat 7 to be provided, or adjustable cooling-air slats 7 may be provided.

In the exemplary embodiment shown in FIG. 1, five adjustable cooling-air slats 7 are provided, which are oriented vertically. In the exemplary embodiment shown in FIG. 5, two adjustable cooling-air slats 7 and one static cooling-air slat 7 are provided, which are oriented horizontally.

In one advantageous exemplary embodiment, the at least one adjustable cooling-air slat 7 or the adjustable cooling-air slats 7 is/are adjustable between a first position, in which the cooling-air slat 7 allows the air flow through the cooling-air opening 3, and a second position, in which the cooling-air slat 7 blocks the air flow through the cooling-air opening 3.

It is preferable if the at least one static cooling-air slat 7 is set in a first position in which the cooling-air slat 7 allows the air flow through the cooling-air opening 3.

In one advantageous concept, the adjustable cooling-air slat 7 or the adjustable cooling-air slats 7 is/are set in the first position when the motor vehicle 1 is at a standstill or at low vehicle speeds below a predefinable speed threshold value or up to a predefinable speed threshold value, and it/they is/are adjustable into the second position only proceeding from speeds equal to or above the speed threshold value. This may also relate to a method for the adjustment of cooling-air slats, such that a method is thus also described in which the cooling-air slats are correspondingly adjusted or controlled.

Here, the speed threshold value advantageously lies at 10 km/h, at 15 km/h or at some other predefinable value of the speed.

FIGS. 1 to 5 show in each case only one lateral region of the motor vehicle front end 2 with a cooling-air opening 3. It may however basically also be the case that, on the motor vehicle front end 2, two cooling-air openings 3 are arranged in a lateral position, which cooling-air openings are advantageously arranged symmetrically with respect to the center of the vehicle, and that an impact-absorbing crossmember 9 is arranged between the two cooling-air openings in the motor vehicle front end 2.

Figure 2:
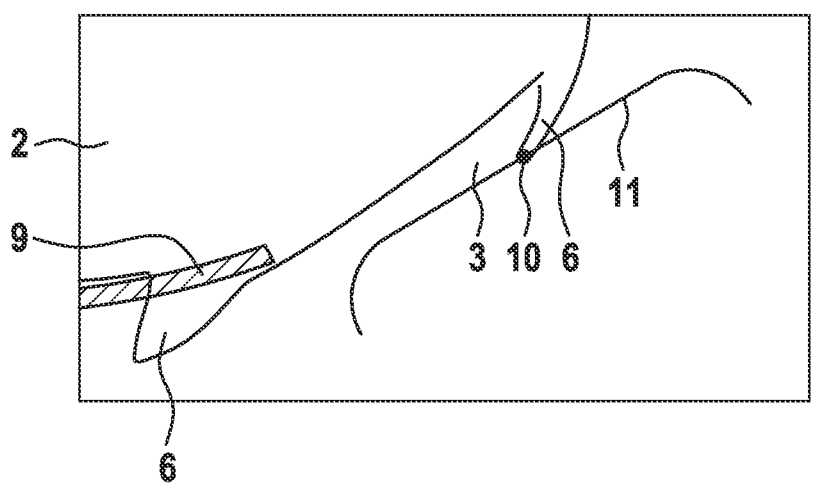
FIG. 2 shows a schematic sectional view of a motor vehicle front end with a cooling-air opening.
Figure 3:
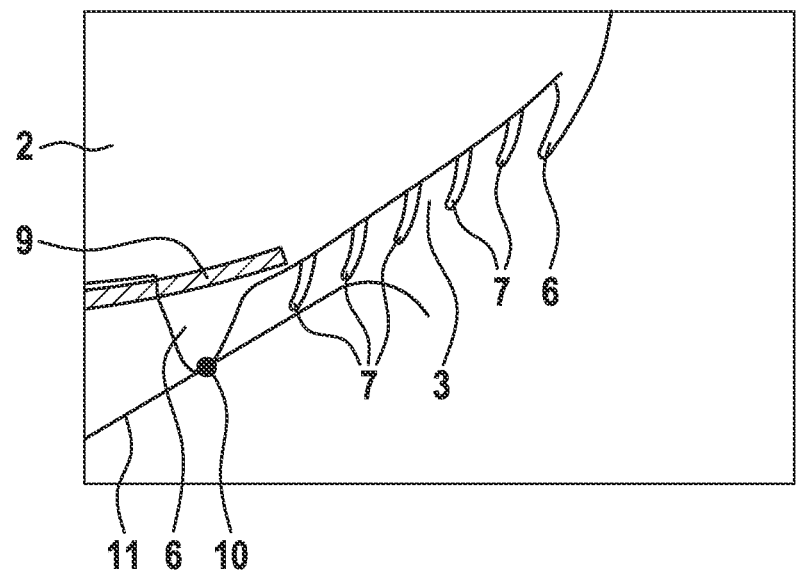
FIG. 3 shows a schematic sectional view of an alternative motor vehicle front end with a cooling-air opening.
Figure 4:
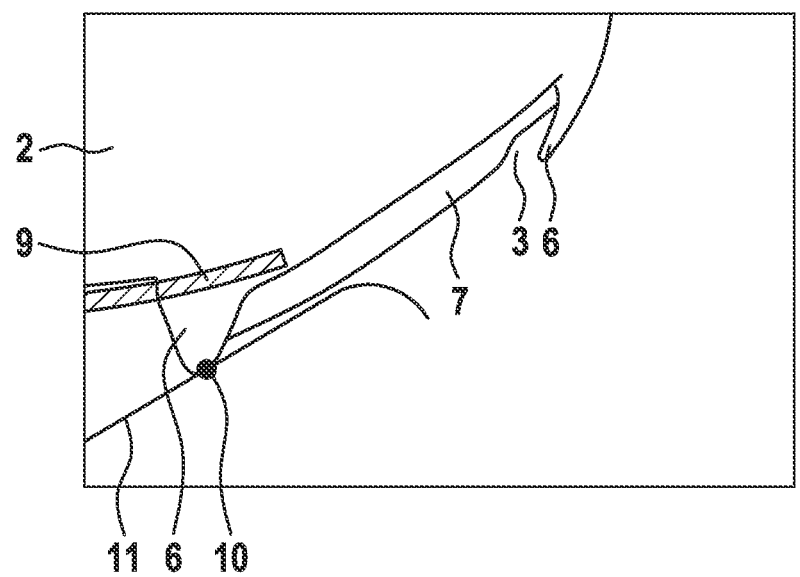
FIG. 4. shows a schematic sectional view of a motor vehicle front end with a cooling-air opening.

As per FIGS. 2 to 4, the cooling-air slats 7 are arranged in the cooling-air opening 3 such that, in their first position, they are arranged such that a 30° contact point 10 of a 30° pendulum 11 in the event of a collision lies not on the cooling-air slats 7 but on a projecting edge region 6 of the cooling-air opening 3.

Here, the motor vehicle front end 2 may be designed such that the crossmember 9 projects laterally into the region of the projecting edge region 6, see FIGS. 2 to 4, such that, in the event of a collision, a force can be transmitted via the projecting edge region 6 to the crossmember 9.

Vertically arranged and running cooling-air slats 7 can be seen in FIG. 3, and horizontally running cooling-air slats 7 can be seen in FIG. 4.

Figure 5:
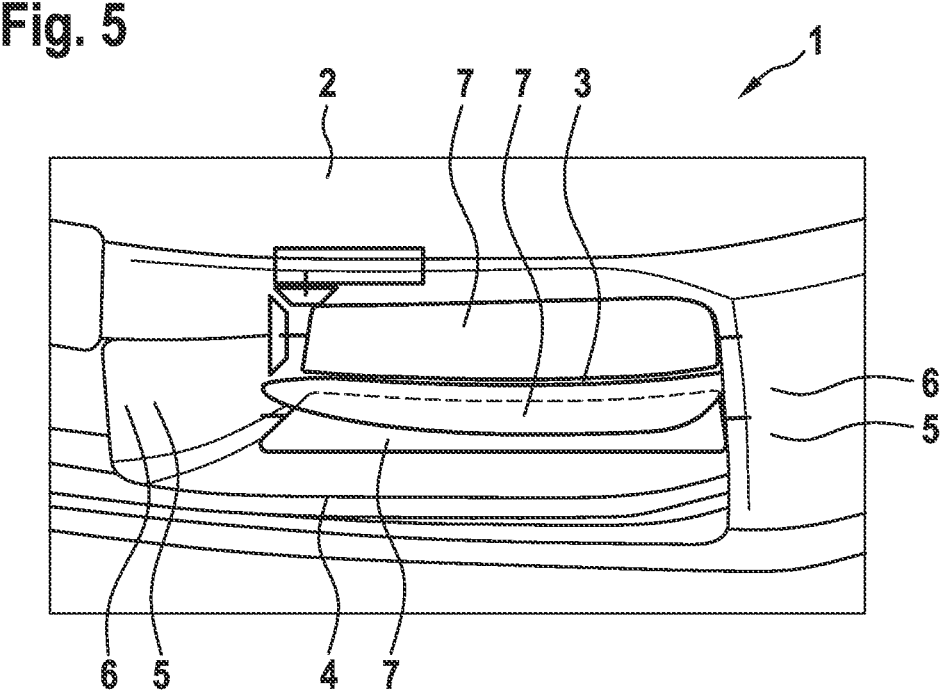
FIG. 5 shows a schematic view of a further motor vehicle front end with a cooling-air opening.

One static cooling-air slat 7 and two adjustable cooling-air slats 7, which are oriented horizontally, can be seen in FIG. 5. Here, the static cooling-air slat 7 is arranged between two adjustable cooling-air slats 7.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Motor vehicle
2 Motor vehicle front end
3 Cooling-air opening
4 Edge
5 Side region
6 Edge region
7 Cooling-air slat
8 Partial opening
9 Cross member
10 30° contact point
11 30° pendulum

What is claimed is:

1. A motor vehicle comprising:
a motor vehicle front end with at least one cooling-air opening,
wherein the at least one cooling-air opening is formed with an encircling edge, the encircling edge comprising a projecting edge region at least at each of two lateral side regions of the encircling edge, each projecting edge region comprising a contact point,
wherein, within the at least one cooling-air opening, there is arranged at least one cooling-air slat which extends through the at least one cooling-air opening less than an extent of the projecting edge region of the two lateral side regions, and divides the at least one cooling-air opening into at least two separate partial openings, and
wherein the extent of each projecting edge region projects in the same direction and away from the motor vehicle front end, and at least one of the contact points projects in front of the at least one cooling-air slat and partially overlaps the front of the at least one cooling-air slat.

2. The motor vehicle as claimed in claim 1, wherein the at least one cooling-air slat extends in a horizontal arrangement and/or in a vertical arrangement through the at least one cooling-air opening.

3. The motor vehicle as claimed in claim 1, wherein the at least one cooling-air slat includes at least one adjustable cooling-air slat and at least one static cooling-air slat.

4. The motor vehicle as claimed in claim 3, wherein the at least one adjustable cooling-air slat is adjustable between a first position, in which the at least one adjustable cooling-air slat allows the air flow through the at least one cooling-air opening, and a second position, in which the at least one adjustable cooling-air slat blocks the air flow through the at least one cooling-air opening.

5. The motor vehicle as claimed in claim 4, wherein the at least one static cooling-air slat is set in a first position in which the cooling-air slat allows the air flow through the at least one cooling-air opening.

6. The motor vehicle as claimed in claim 3, wherein the at least one adjustable cooling-air slat is set in a first position when the motor vehicle is at a standstill or at low vehicle speeds below a predefinable speed threshold value or up to the predefinable speed threshold value, and is adjustable into a second position only proceeding from speeds equal to or above the predefinable speed threshold value.

7. The motor vehicle as claimed in claim 6, wherein the predefinable speed threshold value lies at 10 km/h.

8. The motor vehicle as claimed in claim 1, wherein two cooling-air openings of the at least one cooling air-opening are arranged in a lateral position on the motor vehicle front end, and in that an impact-absorbing crossmember is arranged between the two cooling-air openings.

9. The motor vehicle as claimed in claim 1, wherein the at least one cooling-air slat includes a plurality of cooling-air slats arranged in the cooling-air opening such that, in a first position, the plurality of cooling-air slats are arranged such that a 30° contact point of a 30° pendulum in an event of a collision lies not on the cooling-air slats but on at least one of the projecting edge regions of the at least one cooling-air opening.

10. The motor vehicle as claimed in claim 9, wherein the motor vehicle front end is designed such that a crossmember projects laterally into at least one of the projecting edge regions such that, in the event of a collision, a force can be transmitted via the at least one of the projecting edge regions to the crossmember.

11. The motor vehicle as claimed in claim 1, wherein each cooling-air slat extends through the at least one cooling-air opening and away from the motor vehicle front end less than an extent of a nearest contact point of the at least one contact point.

12. The motor vehicle as claimed in claim 9, wherein at least one of the projecting edge regions further comprises the 30° contact point, and the 30° contact point is positioned in front of the plurality of cooling-air slats and between the plurality of cooling-air slats and a colliding object.

13. The motor vehicle as claimed in claim 1, wherein a first projecting edge region at one of the two lateral side regions is opposite to a second projecting edge region at the other one of the two lateral side regions, and wherein the second projecting edge region projects away from the at least one cooling-air slat.

14. The motor vehicle as claimed in claim 1, wherein the at least one of the contact points projects in front of the at least one cooling-air slat and partially overlaps the at least one cooling-air slat in a direction of an air flow through the at least one cooling-air opening.

15. The motor vehicle as claimed in claim 1, wherein a first projecting edge region at a first lateral side region of the two lateral side regions is positioned farther forward on the motor vehicle front end than a second projecting edge region at a second lateral side region of the two lateral side regions.

* * * * *